Patented Feb. 2, 1954

2,668,097

UNITED STATES PATENT OFFICE 2,668,097

CONTINUOUS ELECTROMETRIC TITRATION

Kauko E. Hallikainen, Berkeley, and Domenick J. Pompeo, Oakland, Calif., assignors to Shell Development Company, San Francisco, Calif., a corporation of Delaware Application May 1, 1950, Serial No. 159,194

3 Claims. (Cl. 23—253)

This invention pertains to methods and apparatus for electrometric titration, and relates more particularly to a system for continuously and automatically performing and recording electrometric titration, particularly in controlling industrial products and treatment processes.

In many processes, it is desirable to control the concentration or purity of a liquid or solution within a range where there is little change in a metered variable, as for example, when controlling the strength of acid, caustic or other solutions between limits wherein variations of concentration are not readily detectable by pH, conductivity or specific gravity measurements.

The concentrations of such solutions may be periodically determined by manual titration. Such determinations are however tedious, time consuming, and subject to human error.

It is therefore an object of this invention to provide a method and an apparatus for continuously and automatically titrating liquids and recording the titration process.

It is also an object of this invention to provide a continuous electrometric titration system suitable for product control in industrial installations.

It is also an object of this invention to provide an electrometric titration system wherein variations in the composition of a liquid to be titrated are determined by recording the rate of flow of said liquid or the rate of flow of a titrating liquid to the titration zone required to maintain the combined liquid in that zone at a predetermined electrometric equivalence value.

These and other objects of this invention will be understood from the following description taken with reference to the appended drawings, wherein.

For clearness, the present method and apparatus will be described and illustrated with regard to a process for continuously analyzing a gasoline for the presence therein of mercaptans by electrometrically titrating said gasoline, automatically indicating and recording the titration results, and automatically controlling the treatment of said gasoline on the basis of said titration results.

It is however fully understood that the present invention is in no way limited to such mercaptan analyzer system, but relates broadly to the automatic electrometric titration recording and control of any solutions, liquids or liquefied gases such as used or produced in chemical and industrial processes, examples of such materials being: acid and alkaline solutions, digestor liquors in the manufacture of paper pulp, bleach baths, etc.

The procedure for the usual manual titration for mercaptans is to dissolve a desired sample in an alcoholic sodium acetate titration solvent and to titrate the solution electrometrically with an alcoholic silver nitrate solution, using as an indicator the potential between a glass reference electrode and a silver sulfide indicating electrode. The titration to the mercaptan end point gives the mercaptan content. The per cent weight of mercaptan as sulfur can then be calculated from suitable equations.

Figure 1:
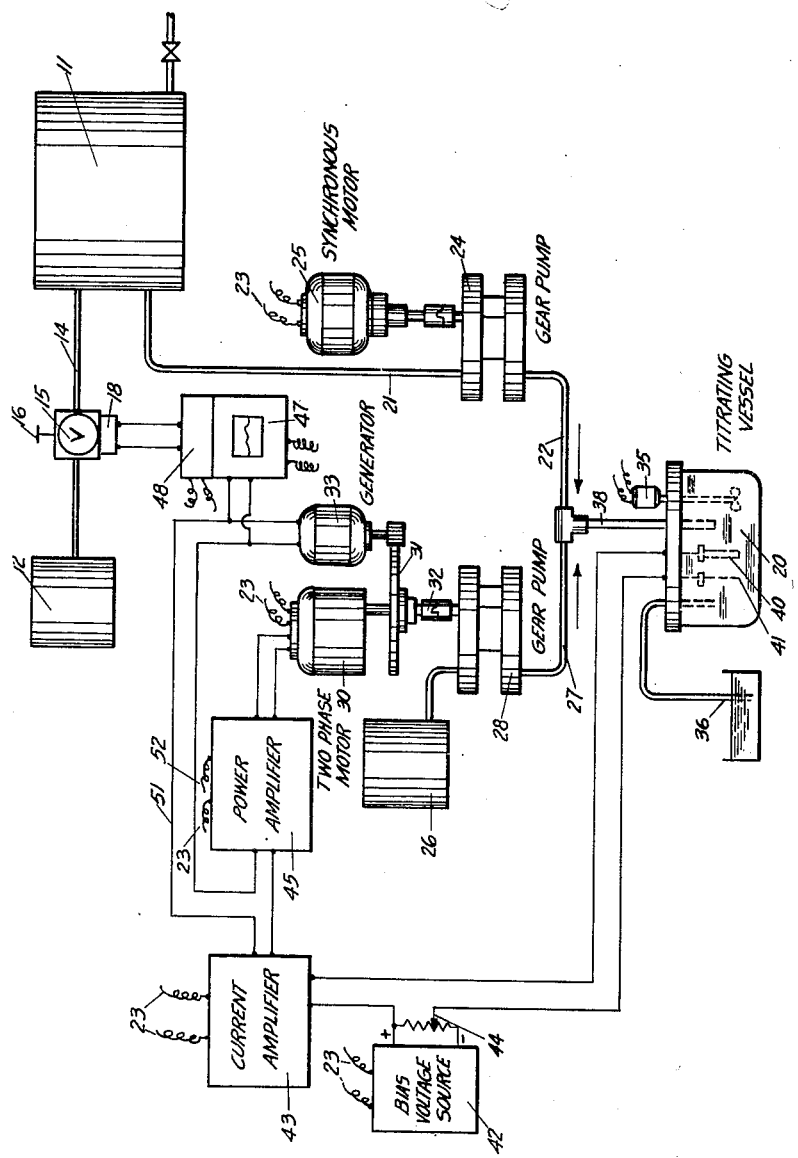
Fig. 1 is a diagrammatic view of the present system.

Referring to the schematic diagram of Fig. 1, the system of the present invention is illustrated in its application to the analysis of the contents of a vessel or tank 11, wherein a liquid, such as gasoline, is stored or is subjected to a treatment for the removal of mercaptans.

For the purposes of such treatment, a suitable solutizing treating agent is supplied to tank 11 from a vessel or tank 12 through a pipe 14 controlled by a valve 15, which may be provided with manually operated closure means, or automatic electrically operated closure means, or both, as shown at 16 and 18 respectively.

A stream or portion of the liquid in tank 11 is delivered to a titrating vessel 20 by means of lines 21 and 22 and a gear pump 24, driven at a constant speed by a synchronous motor 25, energized from a normal 60 cycle power supply. The power supply system is not shown for clarity, but connections thereto are indicated throughout Fig. 1 by the numeral 23.

A titrating solution, such for example as a silver nitrate solution, containing sodium acetate as buffer, is simultaneously delivered to the vessel 20 from a tank or container 26 by means of line 27 and a gear pump 28 driven at a variable speed by a two-phase motor 30. The mechanical drive from the motor 30 to pump 28 comprises a gear train 31, whereby the motor 30 is also made to drive, at a suitable gear ratio, such as 1 to 6, a direct current tachometer generator 33. A clutch 32 is included in the drive to prevent back pumping in case of an excessive potential appearing at the electrodes, as will be seen from the description hereinbelow.

It is also possible to interchange the contents of tanks 11 and 26, so that tank 11 is made to contain the titrating solution which is pumped to the titrating zone at a constant rate, while tank 26 is made to contain the liquid to be titrated which is pumped to the titration zone at a variable rate, the results of the process being identical in both cases, as will appear from the description hereinbelow.

The titrating vessel 20, which is made of a material such as glass, is provided with stirring means shown at 35, overflow means 36, and may be kept, if desired, at a constant temperature by conventional thermostating means, not shown.

The vessel 20 has immersed in the liquid supplied thereto by pipe 38 two electrodes: a reference electrode 40 and an indicating electrode 41 capable of producing a potential therebetween according to the acidity or the alkalinity of the solution in which they are immersed. The electrodes may be made of any materials known to the art and suitable for the purpose: for example, the reference electrode may be made of glass and the indicating electrode of silver sulfide.

The circuit of the electrodes 40 and 41 comprises a bias voltage source such as a constant voltage cell or an equivalent electronic circuit 42, as shown in Fig. 1, whereby a constant biasing voltage of opposing polarity is applied to the lead from the silver electrode 41. The biased potential from electrodes 40 and 41 is successively amplified by a current amplifier 43 and a power amplifier 45, the output of amplifier 45 being used to energize the quadrature phase winding of the two-phase motor 30 whose other phase winding is energized at 23 from the regular 60 cycle power supply circuit.

The output terminals of the D. C. tachometer generator 33 are connected in parallel to a recorder 47 and to the input of the power amplifier unit 45. The recorder 47 may be provided with a further amplifier unit 48, whose output may be used, if desired, for automatically operating or regulating the opening of the valve 18.

The operation of the present system is as follows. As stated above, the liquid from tank 11 is supplied to the titrating vessel 20 at a constant rate by the pump 24, while the titrating liquid from tank 26 is simultaneously supplied thereto by pump 28 at a variable rate necessary to keep the combined solution in vessel 20 at a predetermined equivalence value selected in a manner to be described hereinbelow.

The potential appearing between the electrodes 40 and 41 upon immersion in the fluid supplied to the vessel 20 is subject to variations as a function of the amount of mercaptans present in the liquid from tank 11, that is, as a function of the completeness of their removal by the solutizing treatment. This small variable potential is biased by the bias voltage cell or circuit 42, whereby the input of the amplifier 43 is supplied with a potential which is a differential potential between the bias potential supplied by unit 42, and the variable potential from electrodes 40 and 41, the bias voltage from unit 42 having a constant value predetermined by the setting of the potentiometer connection 44. This differential potential after suitable amplification in amplifiers 43 and 45, which may be, if desired, combined into a single amplifier circuit, is applied to the quadrature winding of the two phase motor 30 to control the speed of this motor and therefore of the delivery rate of pump 28.

The mercaptan content of the liquid from tank 11 is then determined by recording the rate of pumping of the titrating solution from tank 26 required to keep the contents of vessel 20 at the selected electrometric equivalence value. This is effected by recording the output voltage of the tachometer generator 33, which is proportional to the speed of the motor 23 and therefore of the pump 28. The recorder 47 may conveniently be calibrated directly in per cent mercaptan content of the gasoline if desired, the current supplied to the recorder 47 may be also made to operate, after suitable further amplification, the electrical valve 18 or any other instrumentality whereby the severity of the treating process is regulated.

Figure 3:
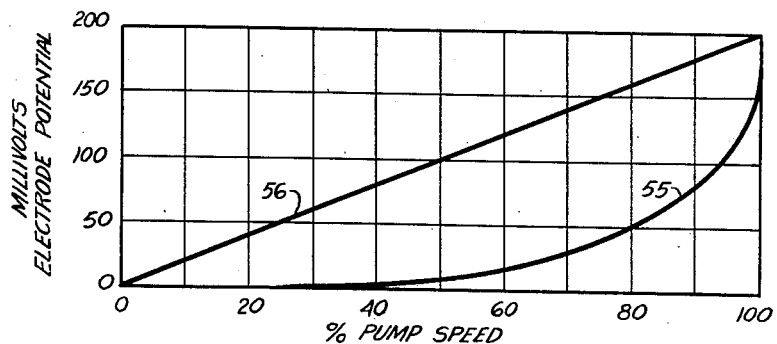

The output terminals of the D. C. generator 33 are also connected back to a suitable point in the amplifier system, for example to the input of amplifier 45. As may be seen from Fig. 3, the characteristics of a two-phase motor such as motor 30 are normally such that the relationship between the voltage produced by electrodes 40 and 41 and the speed of motor 30, and therefore of the pump 28, results in a non-linear function such as represented by curve 55 in Fig. 3. By supplying a portion of the D. C. output of generator 33 back to the input of the amplifier 45, this non-linear relationship can be readily converted to a linear one, as indicated by the line 56, thus greatly simplifying the calibration of the system and at the same time considerably stabilizing the operation of the amplifier 45.

From the above description, it is obvious that the present process will give equivalent results if tank 11 is filled with a titrating fluid which is delivered to the titration zone at a constant rate, while tank 26 is filled with a liquid to be titrated which is delivered to the titration zone at a constant rate.

Figure 2:
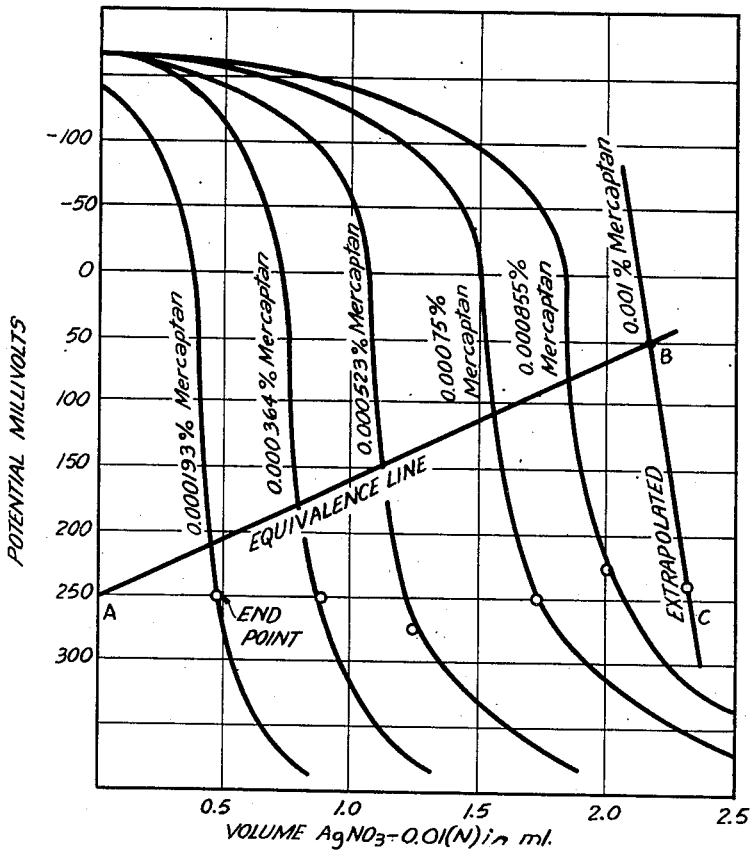
Figs. 2 and 3 are graphs pertaining to the operation of said system.

Referring now to the determination and selection of an equivalence value at which the electrodes 40 and 41 are set to operate, Fig. 2 shows a plurality of curves obtained by manual electrometric titration, with the end point indicated for each curve by a circle. From an inspection of Fig. 2 it will be seen that if the end point for all curves were taken along the line corresponding to +250 millivolts, the error in the calculation of the mercaptan content would be less than one per cent. However, in the present automatic titration system the end points are taken along the line AB of Fig. 2, and a correction is then made by means of a suitable calibration of the recorder as follows.

It is seen from the graph of Fig. 2 that an infinite number of titration curves may be drawn between points A and C, said points corresponding respectively to a zero and to a maximum possible or expected concentration of mercaptans. The six curves drawn by way of illustration in Fig. 2 have mercaptan concentrations of 0.000193, 0.000364, 0.000523, 0.000750, 0.000855 and 0.001 per cent respectively.

Assuming that the equivalence value of the system is selected so as to fall along line AB, it will be seen that when the mercaptan concentration reaches its full or maximum expected value (0.001%), the pump 28 must supply the titrating liquid at full or 100 per cent speed to maintain the voltage produced by electrodes 40 and 41 at said equivalence value. It will be further seen that for full or 100 per cent speed operation of the pump, a difference of potential of 200 mv. is required at the input of the amplifier 43. Under these conditions, if the bias supplied by the cell or unit 42 were set at −250 mv., the potential difference supplied by the glass and the silver sulfide electrodes must be +50 mv. to deliver to the amplifier 43 the input required for full speed operation of the motor 30. Similarly, if 0.0005 per cent mercaptan, or half the maximum possible concentration is present, the motor 30 and pump 28 must operate at half or 50 per cent speed, which requires a differential voltage of +100 mv., or an electrode voltage of +150 mv. The line A—B of Fig. 2 with its origin at +250 mv. is thus identical to line 56 of Fig. 3 with units of volume of the titrating agent converted to unit of per cent pump speed. In calibrating the present system, therefore, the following procedure is followed. A series of curves such as shown in Fig. 1 is obtained by manual electrometric titration. The line AB is then traced, said curve being obtained by disconnecting electrodes 40 and 41, applying calibrated potentials to the input of the amplifier 43 and taking readings of the pump speed over a range from zero to 100 per cent. The differential voltages required by the amplifier 45 for any particular mercaptan concentration are then obtained by reading the ordinate on Fig. 2 between lines AB and AC and suitably adjusting the bias unit 42 and the amplifiers 43 and 45.

We claim as our invention:

1. In a system of continuous electrometric titration, a titration vessel, first pump means connected for supplying thereto a liquid to be titrated, a constant speed motor connected to drive said pump means, second pump means connected for supplying to said vessel a titrating liquid, a variable speed electric motor connected to drive said second pump means, electrodes in said vessel capable of producing a potential upon immersion in the liquid therein, voltage source means in circuit with said electrodes for biasing said potential, amplifier means having their input connected to said electrodes and said biasing voltage source in series and their output connected to said variable speed motor for amplifying and applying said biased potential to said variable speed motor to drive said motor, a direct current generator driven by said motor, a recorder connected to the output of said generator, and feedback means in circuit between the output of said generator and said amplifier means to modify the response of said variable speed motor to variations of the amplified electrode potential applied thereto.

2. In a system of continuous electrometric titration, a titration vessel, first pump means connected for supplying thereto a liquid to be titrated, a synchronous motor connected to drive said pump means at a constant speed, second pump means connected for supplying to said vessel a titrating liquid, a two-phase motor connected to drive said second pump means at a variable speed, electrodes in said vessel capable of producing a variable potential upon immersion in a liquid of variable composition, voltage source means in circuit with said electrodes for biasing said variable potential, amplifier means in circuit with said electrodes and said biasing voltage source for amplifying and applying said biased potential to one of the phase windings of said two-phase motor to drive said motor, a direct current generator driven by said motor, a recorder connected to the output of said generator, and feed-back means in circuit between the output of said generator and said amplifier means to regulate the speed of said motor as a linear function of the variations of the potential between said electrodes.

3. In a system of continuous electrometric titration of a liquid to a predetermined equivalent end point, a titration vessel, a first pump and a second pump connected to said vessel to supply thereto a liquid to be titrated and a titrating liquid respectively, a constant speed motor connected to one of said pumps to drive said pump, a variable speed motor connected to the other pump to drive said other pump, electrodes in said vessel capable of producing a potential upon immersion in the liquid therein, voltage source means connected in circuit with said electrodes for biasing said potential, amplifier means having their input energized by said biased potential and their output connected to said variable speed motor to drive said motor, a generator driven by said motor, a recorder energized by the output of said generator, and feedback means in circuit between the output of said generator and said amplifier means to modify the response of said variable speed motor to the amplified biased electrode potential applied thereto.

KAUKO E. HALLIKAINEN.
DOMENICK J. POMPEO.

References Cited in the file of this patent

UNITED STATES PATENTS

| Number | Name | Date |
|---|---|---|
| 1,096,942 | Owens | May 19, 1914 |
| 1,341,361 | Crandon | May 25, 1920 |
| 1,530,833 | Keeler | Mar. 24, 1925 |
| 1,666,273 | Smith | Apr. 17, 1928 |
| 1,684,645 | Smith | Sept. 18, 1928 |
| 1,943,684 | Martin | Jan. 16, 1934 |
| 2,530,326 | Davis | Nov. 14, 1950 |

OTHER REFERENCES

Sheen Proc. Inst. Soc. Am., 3, 52 (1949).